(12) United States Patent
Hartl

(10) Patent No.: US 12,339,966 B2
(45) Date of Patent: Jun. 24, 2025

(54) METHOD AND COMPUTER SYSTEM FOR CLEARING POSSIBLE MALWARE FROM ELECTRONIC DOCUMENTS

(71) Applicant: Friedrich Hartl, Vienna (AT)

(72) Inventor: Friedrich Hartl, Vienna (AT)

(*) Notice: Subject to any disclaimer, the term of this patent is extended or adjusted under 35 U.S.C. 154(b) by 0 days.

(21) Appl. No.: 18/709,965

(22) PCT Filed: Nov. 16, 2021

(86) PCT No.: PCT/AT2021/060433
§ 371 (c)(1),
(2) Date: May 14, 2024

(87) PCT Pub. No.: WO2023/081938
PCT Pub. Date: May 19, 2023

(65) Prior Publication Data
US 2024/0427893 A1    Dec. 26, 2024

(30) Foreign Application Priority Data
Nov. 15, 2021  (AT) .............................. A 50910/2021

(51) Int. Cl.
*G06F 21/56* (2013.01)
(52) U.S. Cl.
CPC .......... *G06F 21/567* (2013.01); *G06F 21/565* (2013.01)
(58) Field of Classification Search
USPC ......................................................... 726/22
See application file for complete search history.

(56) References Cited

U.S. PATENT DOCUMENTS

| | | | |
|---|---|---|---|
| 10,102,372 B2* | 10/2018 | Huang | G06F 21/563 |
| 10,135,861 B2* | 11/2018 | Harris | G06F 21/563 |
| 10,664,592 B2* | 5/2020 | De Gaetano | G06F 21/567 |
| 2003/0229810 A1 | 12/2003 | Bango | |
| 2006/0272017 A1* | 11/2006 | Largman | G06F 11/1417 |
| | | | 726/22 |
| 2013/0308015 A1 | 11/2013 | Aokage | |
| 2014/0259159 A1* | 9/2014 | Banga | G06F 21/568 |
| | | | 726/22 |
| 2016/0269422 A1 | 9/2016 | McDougal et al. | |
| 2017/0034091 A1 | 2/2017 | Egilmez et al. | |
| 2018/0262470 A1 | 9/2018 | Liberman et al. | |
| 2020/0220985 A1 | 7/2020 | Keery et al. | |
| 2020/0311268 A1* | 10/2020 | Kostyushko | G06F 21/561 |

FOREIGN PATENT DOCUMENTS

| | | | | |
|---|---|---|---|---|
| CN | 111683582 A | * | 9/2020 | ......... A61B 1/00009 |
| DE | 10141007 A1 | | 12/2002 | |
| JP | 3938837 B2 | * | 6/2007 | |
| KR | 1020150089741 A | | 8/2015 | |

* cited by examiner

*Primary Examiner* — Sakinah White Taylor
(74) *Attorney, Agent, or Firm* — GrowIP Law Group LLC

(57) ABSTRACT

The invention relates to a computer system and computer-implemented method for clearing possible malware from electronic documents, comprising the following steps: receiving an electronic original document on a control computer (1); transmitting the electronic original document to a display computer (2); transmitting the document content of the original document via a presentation signal (3) from the display computer (2) to the control computer (1); the control computer (1) creating an electronic document copy from the presentation signal (3).

20 Claims, 3 Drawing Sheets

METHOD AND COMPUTER SYSTEM FOR CLEARING POSSIBLE MALWARE FROM ELECTRONIC DOCUMENTS

CROSS-REFERENCE TO RELATED APPLICATIONS

This application is a U.S. National Stage Application that claims the benefit of the filing date of International PCT Application No. PCT/AT2021/060433, filed Nov. 16, 2021, which claims priority to Austrian Patent Application No. A50910/2021, filed on Nov. 15, 2021, both of which are hereby incorporated by reference in their entirety.

The invention relates to a computer-implemented method as well as a computer system according to the preambles of the independent patent claims.

Malware that reaches a local computer or network by receiving files from insecure sources is a major problem when using computers. For defence against such malware, computer security solutions such as virus programs and software or hardware-based firewalls are known. Repeatedly, however, it is found that these computer security solutions do not recognise new malware or new attack variants, leaving computer users virtually defenseless against such attacks.

Malware often reaches the user's computer via e-mail attachments or files downloaded from the Internet. Often it is almost impossible for a user to recognise whether the file contains malware or not. This is a particular problem for computer systems that receive a large amount of data that is personal data or data that needs to be protected for other reasons. For example, healthcare organisations communicate with a large number of patients who transmit sensitive data by e-mail. However, the source of the electronic documents received is often unknown and therefore potentially insecure.

Now, the object of the invention is to create a method or computer system that enables electronic documents to be cleared of possible malware in a secure and user-friendly manner. In particular, this means that electronic documents can be cleared from malware, whereby the malware as such may be unknown at the time the document content is received and processed. Further, this may optionally mean that the electronic documents are cleared without additional time-consuming work steps by the user.

In particular, the object according to the invention is solved by the features of the independent patent claims.

In particular, the invention relates to a method and/or a computer-implemented method for clearing electronic documents of possible malware, comprising the following steps:
  Receiving an electronic original document on a control computer;
  Transmitting the electronic original document to a display computer;
  Transmitting the document content of the original document via a display signal from the display computer to the control computer,
  The control computer creating an electronic document copy from the display signal.

It may be advantageous if the original electronic document is first converted into an intermediate format before the display signal is generated,
  wherein the original document is in particular an electronic file of a word processing programme, a graphics processing programme or an e-mail programme, such as an electronic file according to one of the following file formats: .doc, docx, pdf, xls, xlsx, ppt, pptx, e-mail or similar,
  and/or wherein the intermediate format is an image file like for example a bitmap file, a pdf file or another container file, optionally containing several document pages.

Optionally, it is provided that the original document, especially in intermediate format, is opened on the display computer.

Optionally, it is provided that the display signal in particular is the monitor signal of the display computer.

Optionally, it is provided that the display signal is recorded and the document content is stored and/or displayed in a separate electronic file as a cleared, electronic document copy.

Optionally, it is provided that the electronic document copy or the original document in intermediate format is processed by text recognition software, and the recognised text is saved in the document copy.

Optionally, it is provided that the original electronic document is received on the control computer from an insecure source, in particular from the Internet and/or from outside the local network.

Optionally, it is provided that the electronic original document is sent from a user computer to the control computer.

Optionally, it is provided that the electronic original document is transmitted to a display computer via a serial data interface.

Optionally, it is provided that the document content of the original document is transmitted from the display computer to the control computer via a HDMI signal or via an optical fibre signal.

Optionally, it is provided that when the document content of the original document is transferred from the display computer to the control computer, the entire document content of the original document is transferred.

Optionally, it is provided that the display computer exclusively transmits a display signal to the control computer or to the grabber.

Optionally, it is provided that further information, such as metadata, a page number, the original file name and/or a QR code, is added to the electronic document copy, wherein this information is added in particular to the display signal.

In particular, the invention relates to a computer system for clearing possible malware from electronic documents, comprising a control computer and a display computer,
  wherein the control computer receives an electronic original document and transmits it to the display computer,
  wherein the display computer transmits the document content of the original document received from the control computer back to the control computer via a display signal,
  and wherein the control computer creates an electronic document copy from the display signal.

The computer system is preferably set up or suitable for executing the method according to the invention.

Optionally, it is provided that a serial data interface is provided, via which the control computer transmits the electronic original document to the display computer.

Optionally, it is provided that an HDMI interface or an optical fibre signal interface is provided, via which the display computer transmits the document content back to the control computer.

A basic problem to be solved in the field of the present invention is that a user usually has to open the electronic document to be cleared in order to check its document content. In practice, a suspicious electronic document often cannot simply be ignored or deleted, as the content may be important for the recipient. The proposed system provides an isolated system, in particular a display computer. This display computer comprises the option of opening the electronic document to be cleared and capturing and/or outputting the document content. However, the display computer is preferably part of an isolated system that is separated from the internal system, i.e. in particular from the local network or the user's computer, in a way that any malicious software may not affect the remaining system, in particular the user's internal system.

Several areas of application may be mentioned as examples for the method or computer system according to the invention:

The document content of electronic documents, for example, can be processed securely and downloaded from the Internet, for example. This applies, for example, to medical findings provided by a patient by e-mail or via download from the Internet. Alternatively, such files may also be made available via a mobile storage medium, such as an USB stick. These files or electronic documents can be cleared of any malicious software using the computer system according to the invention and the method according to the invention. A generic application relates to the clearing of electronic documents received, for example, by e-mail or via another communication medium. Documents downloaded from websites can also be displayed securely, although they must not be opened beforehand.

Optionally, the electronic document to be cleared may be transferred to the isolated system via a serial interface and scrolled through page by page. This interface may preferably only transmit data in one direction.

Optionally, the HDMI interface does not transfer binary files or programme files but exclusively the image of a document page displayed by the isolated system.

Optionally, the internal system may use an additional QR code displayed on the screen of the isolated system to receive information on how many pages are contained in the document and, optionally, that the display of the requested page(s) has been completed.

Preferably, the internal system picks up the screen signal from the display PC via a grabber, saves it as an image and requests the next page or the next section-until the entire document or the entire document content has been transferred. It then generates a cleared document copy from all images and, in particular, a secure PDF document.

If the isolated system is compromised by a malicious software, it only affects the isolated system. As there is no vulnerable data connection to the internal system, insecure files can not return to the internal system.

Optionally, the display computer may simply be reset if it is infected by malicious software. Optionally, the system may be reset by simply replacing the system memory, for example a micro SD card, in order to restore full functionality.

Optionally, the display computer may use a read-only file system so that malicious software cannot infiltrate the operating system at all.

Optionally, the system may be reset by a simple restart to restore full functionality.

Preferably, the computer system works fully automatically and no classification of individual files (by users or similar) is necessary. The hardware required for the computer system is preferably made up of simple, commercially available components and is therefore inexpensive.

When transmitting the document content of the original document via a display signal from the display computer to the control computer, the display signal is optionally supplemented by a control signal integrated into the display signal, e.g. in the form of QR codes from the display computer to the control computer.

Preferably, the intermediate format is an image file. Optionally, the intermediate format is a bitmap file, a pdf file or another container file that contains several document pages.

The invention is further described below with reference to the figures.

Figure 1:
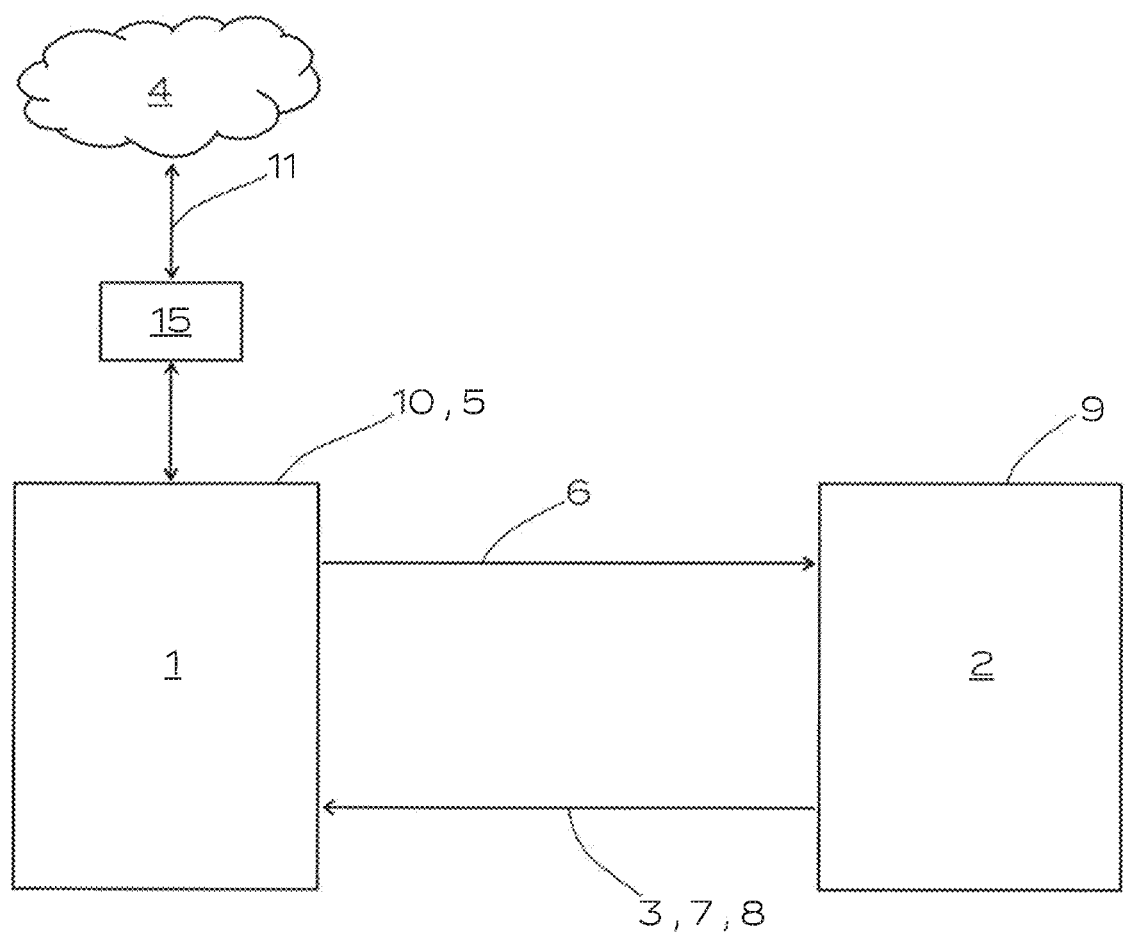
FIG. 1 shows a schematic representation of the basic components of the computer system or method.

Unless otherwise indicated, the reference numbers correspond to the following components: control computer 1, display computer 2, display signal 3, insecure source 4, local network 5, serial data interface 6, HDMI signal 7, HDMI interface 8, isolated system 9, internal system 10, network interface 11, display device 12, grabber 13, splitter 14, user computer 15, IMAP server 16, SMTP server 17.

FIG. 1 shows a schematic representation of the basic components of a possible embodiment of a computer system, in particular for executing a described method. An electronic document such as an electronic file of a word processing programme, a graphics processing programme, an e-mail programme, in particular an unopened attachment of an e-mail programme, or the like is sent to the internal system 10 from an insecure source 4. The electronic document may be a document from any insecure source. For example, a document downloaded from a website or a document received via a mobile data carrier. The internal system 10 is, for example, a local network 5 to which a user computer 15 is coupled, wherein the user computer 15 may either be directly integrated into the local network 5 or connected to it by means of a router or firewall, or may communicate indirectly with the internal system, for example by sending e-mails, transmitting documents via a mailbox or transmitting documents via a server service on the Internet. In particular, according to the present embodiment, the internal system 10 includes a control computer 1. The document or file is transmitted to the control computer 1 via a network interface 11, for example by e-mail or other digital means. Before the electronic document to be cleared is opened in the internal system 10, it is transmitted from the control computer 1 to a display computer 2. The electronic document to be cleared may be transmitted to the display computer 2 via a suitable data connection or data interface, in particular via a serial data interface 6. The display computer 2 is part of an isolated system 9. This isolated system 9 is preferably isolated from the internal system 10 to such an extent that any malicious software from the display computer 2 may not reach the internal system 10, the control computer 1 and especially not the user computer 15.

The display computer 2 generates a display signal 3 and transmits it back to the control computer 1. The display signal 3 is generated in particular by opening the electronic document to be cleared on the display computer 2. Subsequently, the signal that is preferred to usually be sent to a display device 12, such as a monitor, is sent back to the control computer 1. However, this display signal 3 only contains information about the displayed image. Malicious software cannot usually be transmitted via this signal. Optionally, the display signal 3 is a HDMI signal 7, which is transmitted via a HDMI interface 8. This display signal 3 may then be used by the control computer 1 to create an electronic document copy, wherein this document copy preferably only copies the document content, but not any malware or metadata.

Optionally, it is provided that the electronic original document is first converted into an intermediate format before the display signal 3 is generated. The intermediate format may, for example, be an image file such as a bitmap file or a PDF file. The original document may basically be any type of document file that the display computer 2 can open.

Preferably, it is provided that the document to be cleared is transmitted from the control computer 1 to the display computer 2 via an interface or a data line that can only send data in one direction. For example, this may be implemented via a serial interface 6.

Optionally, additional information may be supplemented to the display signal 3 in all embodiments. For example, further information such as a page number or other information may be added to the document content. This information may, for example, be noted in the electronic copy of the document. For example, a QR code may appear in the document copy, which provides information about metadata such as page number, original file name or other information.

Figure 2:
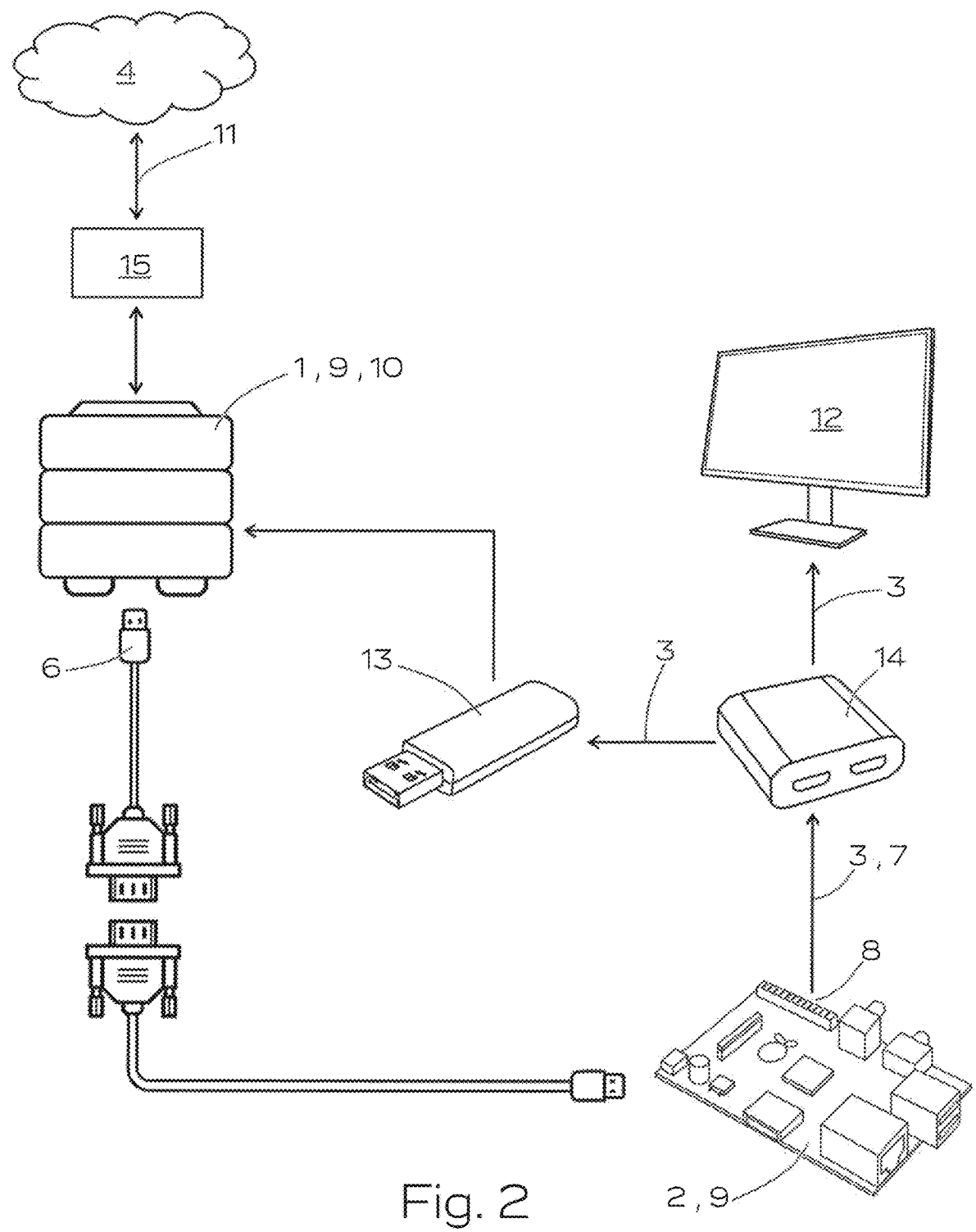
FIG. 2 shows a possible configuration of a computer system.

FIG. 2 shows a possible configuration of a computer system. The system comprises a control computer 1 which is connected to a display computer 2. In particular, this connection is established via a serial data interface 6. In this case, a USB-RS232 adapter is connected to each of the USB ports of the control computer 1 and the display computer 2, wherein the two serial interfaces are coupled with each other via a null modem connection, wherein these two cables are coupled together via a null modem connection to establish the connection.

A user computer 15 is connected to an insecure source 4 via a network interface 11 to receive electronic documents to be cleared. In order to clear these electronic documents, the user computer 15 may send the electronic file or the electronic document to be cleared-preferably unopened—to the control computer 1.

This can, for example, be done via a REST interface. The control computer 1 thus receives electronic documents from an insecure source 4.

In the present embodiment, the computer system comprises a display device 12, which in particular is configured as a monitor. This display device 12 is suitable and/or set up to display the display signal 3 of the display computer 2 and optionally of the control computer 1. Optionally, two display devices 12 may also be provided for this purpose, although this embodiment is not shown. The display computer 2 is connected to the control computer 1 to transmit the display signal 3 to the latter. In particular, this is done via the HDMI interface 8 or via the HDMI signal 7. In the present embodiment, a so-called grabber 13 is provided for this purpose, i.e. a device that digitizes or records the display signal 3. This grabber 13 is connected to the control computer 1 so that it may record the display signal 3 or process the recorded signal to create a digital document copy.

In the present case, a splitter 14 is provided between the grabber 13 and the display computer 2, which routes the display signal 3 to the grabber 13 on the one hand and to the display device 12 on the other. Optionally, the connection between the display computer 2 and the display device 12 may be omitted.

As an alternative to the HDMI signal 7, the transmission of the display signal 3 may be via an optical fibre signal in all embodiments.

If an electronic document to be cleared is now transmitted from the insecure source 4 to the control computer 1, this file is preferably forwarded unopened to the display computer 2. The electronic document to be cleared is opened and displayed on the display computer 2 or a display signal 3 is generated. The display signal 3 is sent back to the control computer 1, wherein a grabber 13 is preferably provided between the control computer 1 and the display computer 2. The display signal 3 is saved and/or displayed. This creates a cleared, digital document copy.

Optionally, further information is added to the document copy on the display computer 2 or on the control computer 1, such as the page number or a QR code.

As noted, in the computer system, the electronic document to be cleared, such as a PDF file, word processing file or other file, is sent or transmitted from the user, in particular from the user computer 15, to the control computer 1. For example, this transmission can be done via a REST interface.

Optionally, the file is converted into an intermediate format on the display computer 2, for example into a PDF file. Further, the display computer 2 may scroll through the electronic document and send it back to the control computer 1 section by section, in particular page by page, as a display signal 3. The control computer 1 may then record these sections or pages as an image and in turn convert them into a readable file format, such as a PDF file in particular.

Optionally, the digital document copy is analysed by text recognition software so that the text of the image file is recognised and may be easily reused by the user.

The digital document copy, in particular with further information, may then be sent back to the user computer 15 of the user, in particular in response to the REST request.

Preferably, the control computer 1 has no connection to the Internet and is also preferably not used interactively. Instead, the electronic document to be cleared is optionally provided on a computer located in the same sensitive network and transmitted directly to the control computer 1 without opening it.

The display computer 2 is also preferably not integrated into the local network 5, but is only connected to the control computer 1 via the necessary interfaces for transmitting and generating the display signal 3. If the display computer 2 is infected by a malicious software, it can simply be reset.

The control computer 1 is optionally equipped with a HDMI simulator dongle so that it always generates an image that may be displayed via the internal network using VNC. The connection to a monitor is simulated to the display computer 2, as the grabber 13 recognises itself as a monitor. In this case, one would have to rely on the grabbed images for troubleshooting. If this is not enough, an external monitor may optionally be connected via a HDMI splitter.

Figure 3:
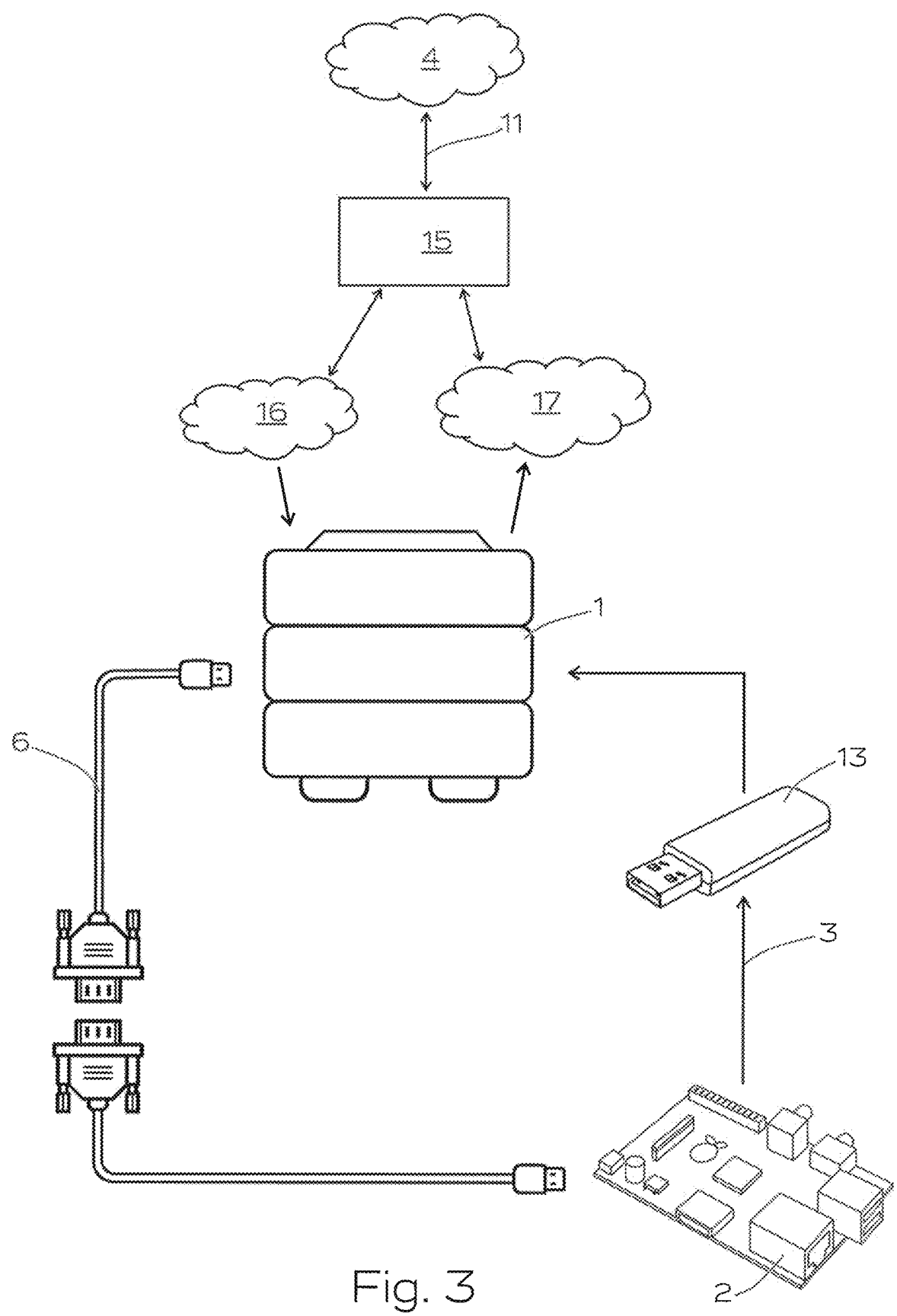
FIG. 3 shows a schematic representation of a further embodiment of a possible computer system according to the invention.

FIG. 3 shows a schematic representation of a computer system. The computer system comprises a control computer 1 and a display computer 2. The electronic document to be cleared is transmitted to the control computer 1 in particular by e-mail, for example via an IMAP server 16. The control computer 1 recognises the file(s), optionally downloads them or extracts the attachments, for example files with the extensions pdf, doc, docx, xls, xlsx, ppt, pptx etc.

The electronic documents to be cleared are transferred to the display computer 2, preferably one at a time. This is done, for example, via a serial data interface 6. Preferably, the display computer 2 converts the documents to be cleared into an intermediate format, opens it and scrolls through the files section by section or page by page. This generates a display signal 3, which is transmitted back to the control computer 1. In particular, this is realised via the screen output of the display computer 2 via a grabber 13. In addition, as in the other embodiments, the generated image may be analysed by text recognition software to capture the text. Subsequently, the data, in particular image data, text data and further information, may be assembled into a displayable document. This document may for example be a PDF file. Optionally, the assembly is performed on the control computer 1. Subsequently, this file may be sent back to the user as an e-mail. For example, the control computer 1 is connected to an SMTP server 17 for this purpose.

Preferably, it is provided that the control computer 1 is connected to the Internet, but this connection is limited to communication with the e-mail server or e-mail servers. The display computer 2 is preferably not part of the local network 5.

The invention claimed is:

1. A computer-implemented method for clearing possible malware from electronic documents, comprising:
   receiving, without opening, an electronic original document on a control computer from an insecure source from the Internet and/or from outside a local network that includes the control computer, wherein receiving the electronic document does not involve scrolling or recognizing text in the electronic original document;
   transmitting the electronic original document from the control computer to a display computer of an isolated system, via an interface or a data line that only sends data in one direction;
   opening the electronic original document on the display computer to determine document content, wherein opening the electronic document involves scrolling or recognizing text in the electronic document;
   transmitting the document content of the electronic original document via a display signal from the display computer to the control computer; and
   the control computer creating an electronic document copy from the display signal.

2. The method according to claim 1,
   wherein the electronic original document is first converted into an intermediate format before the display signal is generated,
   wherein the electronic original document is an electronic file of a word processing programme, a graphics processing programme or an e-mail programme, such as an electronic file according to one of the following file formats: .doc, docx, pdf, xls, xlsx, ppt, pptx, e-mail or similar,
   and wherein the intermediate format is an image file and/or a bitmap file, a pdf file or another container file containing several document pages.

3. The method according to claim 1,
   wherein the display signal is a monitor signal of the display computer, and
   wherein the display signal is recorded and the document content is stored and/or displayed in a separate electronic file as a cleared, electronic document copy.

4. The method according to claim 1, wherein the electronic document copy is processed by a text recognition software and the recognised text is saved in the electronic document copy.

5. The method according to claim 1,
   wherein the electronic original document is sent from a user computer to the control computer.

6. The method according to claim 1, wherein the electronic original document is transmitted from the control computer to the display computer via a serial data interface.

7. The method according to claim 1, wherein the document content of the electronic original document is transmitted from the display computer to the control computer via a High Definition Multimedia Interface (HDMI) signal or via an optical fibre signal.

8. The method according to claim 1, wherein, when the document content of the electronic original document is transmitted from the display computer to the control computer, the entire document content of the electronic original document is transmitted.

9. The method according to claim 1, wherein the display computer exclusively transmits a display signal to the control computer.

10. The method according to claim 1, wherein further information, such as metadata, a page number, the original file name and/or a QR code, is added to the electronic document copy, and
    wherein the further information is added in particular to the display signal.

11. A computer system for clearing possible malware from electronic documents, comprising display computer of an isolated system and a control computer,
    wherein the control computer receives, without opening, an electronic original document from an insecure source from the Internet and/or from outside a local network that includes the control computer, and wherein, upon receiving the electronic original document, the control computer neither scrolls nor recognizes text in the electronic original document,
    wherein the control computer transmits the electronic original document to the display computer via an interface or data line that only sends data in one direction,
    wherein the display computer opens the electronic original document to determine document content, which involves scrolling and/or recognizing text in the electronic original document,
    wherein the display computer transmits the document content of the electronic original document back to the control computer via a display signal,
    and wherein the control computer creates an electronic document copy from the display signal.

12. The computer system according to claim 11, wherein a serial data interface is provided, via which the control computer transmits the electronic original document to the display computer.

13. The computer system according to claim 11, wherein a High Definition Multimedia Interface (HDMI) or an optical fibre signal interface is provided, via which the display computer transmits the document content back to the control computer.

14. The method according to claim 2,
    wherein the electronic original document in the intermediate format is opened on the display computer,
    wherein the display signal is a monitor signal of the display computer, and wherein the display signal is recorded and the document content is stored and/or displayed in a separate electronic file as a cleared, electronic document copy.

15. The method according to claim 2, wherein the electronic original document in the intermediate format is processed by a text recognition software and the recognised text is saved in the document copy.

16. The method according to claim 1, wherein the display computer exclusively transmits a display signal to a grabber.

17. The computer system according to claim 11, wherein the electronic original document is first converted into an intermediate format before the display signal is generated,
wherein the electronic original document is an electronic file of a word processing programme, a graphics processing programme or an e-mail programme, such as an electronic file according to one of the following file formats: .doc, docx, pdf, xls, xlsx, ppt, pptx, e-mail or similar,
and wherein the intermediate format is an image file and/or a bitmap file, a pdf file or another container file containing several document pages.

18. The computer system according to claim 17,
wherein the electronic original document in the intermediate format is opened on the display computer,
wherein the display signal is a monitor signal of the display computer, and
wherein the display signal is recorded and the document content is stored and/or displayed in a separate electronic file as a cleared, electronic document copy.

19. The computer system according to claim 17, wherein the electronic original document in the intermediate format is processed by a text recognition software and the recognised text is saved in the document copy.

20. The computer system according to claim 11, wherein the display computer exclusively transmits a display signal to a grabber.

* * * * *